United States Patent

Carlson

[15] 3,674,758

[45] July 4, 1972

[54] STABILIZED TETRAFLUOROETHYLENE-FLUOROOLEFIN COPOLYMERS HAVING METHYL ESTER END-GROUPS AND PROCESS FOR PRODUCING SAME

[72] Inventor: Dana Peter Carlson, Wilmington, Del.

[73] Assignee: E. I. du Pont de Nemours and Company, Wilmington, Del.

[22] Filed: April 1, 1968

[21] Appl. No.: 717,926

[52] U.S. Cl. .................................................. 260/87.5 A
[51] Int. Cl. ........................................................ C08f 15/06
[58] Field of Search .......................................... 260/87.5 A

[56] References Cited

UNITED STATES PATENTS 3,250,808    5/1966    Moore, Jr. et al. ................... 260/535

FOREIGN PATENTS OR APPLICATIONS 1,434,537    2/1966    France .................................. 260/87.5

Primary Examiner—Joseph L. Schofer
Assistant Examiner—J. A. Donahue, Jr.
Attorney—Edwin Tocker

[57] ABSTRACT

Stabilized tetrafluoroethylene-fluoroolefin copolymers having methyl ester end-groups are produced from tetrafluoroethylene-fluoroolefin copolymers having carboxylic acid end-groups and acid fluoride end-groups by contacting the polymer with methanol at from about 65–200° C. for the carboxylic acid end-groups and from about 0–200° C. for the acid fluoride end-groups and then drying the stabilized polymer.

5 Claims, No Drawings

STABILIZED TETRAFLUOROETHYLENE-FLUOROOLEFIN COPOLYMERS HAVING METHYL ESTER END-GROUPS AND PROCESS FOR PRODUCING SAME

In general, fluorocarbon copolymers are known to have outstanding thermal stability. However, certain copolymers of tetrafluoroethylene (TFE) have a certain amount of instability introduced into the polymer by the initiation and termination steps of the polymerization. Both the initiation and termination of the chain can result in unstable end-groups, such as carboxylic acid end-groups and acid fluoride end-groups which on storage can be converted into carboxylic acid end-groups. During melt extrusion carboxylic acid groups degrade and form gases which become bubbles in the polymer.

These unstable carboxylic acid and acid fluoride end-groups can be stabilized by a high-temperature humid heat-treatment process as disclosed in U. S. Pat. No. 3,085,083, entitled Stabilized Tetrafluoroethylene-Fluoroolefin Copolymers Having $CF_2H$ End-Groups. The main disadvantages of the humid heat-treatment process are that it is very expensive and adds considerable cost to polymers that are treated in this manner and also tends to add or allow contamination of the polymer with dust and other particles which may be introduced in the heat-treatment process.

SUMMARY OF THE INVENTION

Methyl ester end-groups are easily formed on TFE copolymers having carboxylic acid end-groups or acid fluoride end-groups by mixing small amounts of methanol with the polymer at from about 65° – 200° C. for the carboxylic acid end-groups or at from about 0° – 200° C. for the acid fluoride end-groups. The ester end-groups are quite stable under prolonged storage at extrusion temperatures. No disadvantages were introduced by these ester end-groups. For example, the electrical properties of polymers containing a large number of methyl ester end-groups were found to be equivalent to polymers containing stable end-groups such as $-CF_2H$.

Tetrafluoroethylene copolymers produced by non-aqueous dispersion polymerization methods having acid fluoride end-groups can be effectively stabilized by a process which comprises the steps of:

a. contacting said copolymers with methyl alcohol at temperatures from about 0° C. to about 200° C.; and b. recovering the methyl ester of the tetrafluoro-ethylene copolymer.

When the tetrafluoroethylene copolymers are produced by aqueous dispersion methods and have carboxylic acid end-groups as a result thereof, the acid end-groups can be stabilized in the same manner as above with methyl alcohol but the temperatures of step (a) must be from about 65° C. to about 200° C.

The resins this process is applicable upon are any of the resins produced by an aqueous process which results in the polymer having carboxylic acid end-groups. Examples of such resins include copolymers of TFE with hexafluoropropylene (HFP) or perfluoroalkyl perfluorovinyl ethers which are prepared in an aqueous media with persulfate initiators. Also, resins such as tetrafluoroethylene/perfluoroalkyl perfluorovinyl ether copolymers produced in a non-aqueous media and which contain acid fluoride end-groups, can be esterified by this process.

Preferred resins this process is applicable on are the copolymers of tetrafluoroethylene monomer and at least one monomer selected from the class of monomers consisting of: fluoroolefins having the general formula

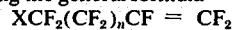

where X = F or H and n = 0 – 9 such as hexafluoropropylene, perfluoropentene-1, and 8 hydroperfluorooctene-1; fluorovinyl ethers having the general formula

where X = F or H and n = 0 – 7 such as perfluoromethyl perfluorovinyl ether, perfluoroethyl perfluorovinyl ether, perfluoropropyl perfluorovinyl ether, and 3-hydroperfluoropropyl perfluorovinyl ether; fluorovinyl polyethers having the general formula

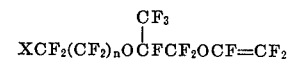

where X = F or H and n = 0 – 7; and perfluoro(2-methylene-4-methyl-1,3-dioxolane) prepared in either aqueous or non-aqueous media.

A wide range of reaction conditions are effective to produce the desired ester. In general higher temperatures and higher pressures are best for quick esterification of polymers with carboxylic acid end-groups. Polymers with acid fluoride end-groups can normally be esterified by contacting the polymer with methanol at room temperature.

The preferred temperature range for esterifying copolymers having acid fluoride (—COF) end-groups is from about 20° C. to about 65° C. The preferred temperature range for esterifying copolymers having carboxylic acid (—COOH) end-groups is from about 130° C. to about 200° C. The temperature range is necessary because the aqueously produced copolymers containing carboxylic acid end-groups are more difficult to esterify and thus require more strenuous heating than do the non-aqueously produced copolymers containing acid fluoride end-groups.

The process is operable either by making a slurry of the copolymer of TFE in liquid methanol or by vapor contacting the copolymer with methanol. In addition, with non-aqueous copolymers of TFE, the process is operable by adding methanol to the slurry of the copolymer with the solvent in which it was formed. It is preferred that the copolymer be allowed to remain in contact with the methanol until at least half of the acidic end groups of the copolymer have been converted to methyl ester end groups.

Methanol is the preferred reagent for forming the methyl ester of the TFE copolymer but other reagents such as trimethyl orthoformate or trimethyl orthoacetate can be used to carry out the esterification. Methanol is the preferred reagent because of its ready availability and low cost. The esterifying reagent should be in molar excess to force the reaction to go toward the production of the ester of the TFE copolymer.

The existence and quantity of certain end-groups in the polymer were determined by the infrared spectrum generally obtained on compression molded films of about 10 mils thickness. The end-groups of interest were found to absorb at 1883 cm.$^{-1}$, 1814 cm.$^{-1}$, 1800 cm.$^{-1}$, 1793 cm.$^{-1}$ and 1781 cm.$^{-1}$. The 1883 cm.$^{-1}$ band measures the acid fluoride group (—COF) in the polymer. The 1814 and 1781 cm.$^{-1}$ bands measure the free and bonded forms, respectively, of the carboxylic acid groups (—COOH). The 1,800 cm.$^{-1}$ band measures the methyl ester group (—COOCH$_3$) and the 1793 cm.$^{-1}$ band measures the vinyl end-group (—CF = CF$_2$). The quantitative measurement of the number of these groups was obtained by the measurement of the extinction coefficients of each of these groups from model compounds and transferring these coefficients to the measurements obtained on the polymer. Because of the overlapping of some of the bands it was found necessary to correct the absorbances for contributions from several groups. The end-groups are expressed as the number per one million carbon atoms in the polymer.

The stability of a fluorocarbon polymer during melt fabrication may be measured by a number of tests. A preferred test comprises the measurement of the change in melt viscosity when the polymer is exposed for a period of time to high temperatures, either in the presence or absence of oxygen. The term "specific melt viscosity" as used herein means the apparent melt viscosity as measured at 380° C. under a shear stress of 6.5 pounds per square inch. Specific melt viscosity is determined by using a melt indexer of the type described in ASTM D-1238-52-T, modified for corrosion resistance to embody a cylinder, orifice, and a piston made of Stellite cobaltchromium-tungsten alloy. The resin is charged to the 0.375 inch I. D. cylinder which is held at 380° C. ±0.5° C. allowed to come to an equilibrium temperature during 5 minutes, and extruded through the 0.0825 inch diameter, 0.315 inch long orifice under a piston loading of 5,000 grams. The specific melt viscosity in poises is calculated at 53,150 divided by the observed extrusion rate in grams per minute. The stability of the polymer may also be measured by the volatiles index. In this test, a 10 g. sample of the resin is placed in an aluminum foil thimble, which is charged into a glass vial attached to a vacuum system. The vial is evacuated to 2 mm. (Hg) and then on reaching an equilibrium, placed in a hot block maintained at 380° C. The change in pressure is recorded every ten minutes over a period of 60 minutes. The volatiles index is calculated by the following equation $$V.I. = \frac{(P_{40} - P_0)V}{10}$$

where $P_{40}$ and $P_0$ are the pressures of the sample in mm. prior to insertion and after 40 min. in the hot block and V is the volume of the vial.

It is preferred that the volatiles index be less than 25 because above a volatiles index of 25 the amount of bubbles formed on extrusion are detrimental to the resins properties.

The following examples will better illustrate the nature of the present invention; however, the invention is not intended to be limited to these examples. Parts are by weight unless otherwise indicated.

EXAMPLE I

Into a conventional one-liter stainless steel agitated pressure vessel were charged 850 ml. of 1,2,2-trichloro1,1,2-trifluroethane ("Freon"-113 or F-113), 14 grams of perfluoropropyl/perfluorovinyl ether (PPVE) and 20 ml. of a 0.027 gram/cc. solution of bis(perfluoropropionyl) peroxide (3P) in F-113. The pressure was maintained at 30 psig. during the polymerization run by continuous addition of tetrafluoroethylene (TFE). The temperature was controlled at 50° C. by circulating water in the jacket of the autoclave and conventional control elements. After 20 minutes the polymer suspension was removed, mixed with 750 ml. of methanol and filtered through a fritted glass funnel. The gelatinous filter cake was washed with 500 ml. of methanol in an Osterizer blender and filtered. This procedure was repeated three times. The polymer was then dried for 16 hours at 130° C. in an air circulating oven. A similar polymerization run was made in which the polymer was not treated with methanol but was filtered and dried as above. Both the methyl ester capped polymer and the uncapped polymer were boiled in water for 4 hours and 16 hours and the end-groups and volatiles indices were measured as described above and compared. The methyl ester capped polymer maintained a low volatiles index (less than 25) throughout the test, while that of the uncapped polymer markedly increased (to approximately 39). The number of methyl ester end-groups of the methyl ester capped polymer was virtually unchanged after being boiled for 16 hours.

EXAMPLE II

A polymer was prepared similarly to that in Example I except that a one-gallon autoclave and larger amounts of starting material, 5,070 grams F-113, 40.1 grams PPVE and 56 ml. of a 0.08 gram/cc. solution of 3P were used. The vessel was pressured to 30 psig. with TFE and held at 50° C. To approximately 1 liter of the gel obtained was added 1 ml. of methanol and the mixture was manually mixed for several minutes, filtered on a basket centrifuge, and dried at 100° C. for 16 hours. After drying, a small part was extracted with water in a Soxhlet apparatus for 16 hours and then dried for 2 hours at 100° C. The volatiles indices of the methyl ester end capped polymer were low (less than 25). End-group analysis, by the procedure used in Example I, of the methyl ester end capped polymer indicated that the ester groups were stable to the above aging procedure.

EXAMPLE III

To a 180 ml. stainless steel tube was added 15 grams of methyl ester capped polymer fluff and a 10 ml. film of a methyl ester capped polymer, prepared as in Example II (with the exception that only 49 ml. of a 0.057 grams/cc. solution of 3P were used) and 90 ml. of distilled water. The tube was sealed and evacuated to remove air and then heated to 225° C. for 4 hours. The polymer fluff and film were recovered and dried 16 hours at 125° C. The end-groups on the polymer were determined both before and after the above treatment by infrared analysis as in Example I. Results indicated that the methyl ester end-groups remained stable during the treatment.

An uncapped polymer was treated in water for 4 hours at 100° C. for comparison and its end-groups were analyzed both before and after treatment. Most of the acid fluoride end-groups were converted to carboxylic acid end-groups which caused an increase in the volatiles index.

EXAMPLE IV

The polymer for this Example was prepared as in Example I using 1,340 grams F-113, 10.6 grams PPVE, 0.60 gram 3P initiator in an autoclave pressured to 30 psig. with TFE. The polymer was then methyl ester end capped by adding 5 ml. methanol to the dispersion of the polymer in F-113, stirring, filtering, and drying overnight at 100° C. A ten-gram sample of the methyl ester capped polymer was placed in a Pyrex glass tube and inserted into an aluminum block held at 380° C. A very slight air stream was blown into the sample tube. After 15 minutes the sample was removed and weight loss, melt viscosity at 380° C., and the number and type of end-groups were measured. The treatment was repeated using 30 and 60 minutes. After 30 minutes the number of methyl ester end-groups was essentially unchanged. Methyl ester end-groups were undetectable only after 60 minutes at 380° C. Only small changes were noted in the weight and melt viscosity of the sample.

Another sample of similar methyl ester capped polymer was subjected to oxidative attack by placing it in an air circulating oven at 300° C. The change in melt viscosity was very small after 6 hours. After 4 hours the number of methyl ester end-groups had decreased only slightly. Methyl ester groups were undetectable only after 6 hours at 300° C.

EXAMPLE V

Each of several batches of polymer prepared as in Example III, were treated with 10 ml. of methanol, stirred, centrifuged, treated with 2,500 ml. methanol for 10 minutes, centrifuged and then dried at 125° C. overnight. A blend of the methyl ester capped polymers was prepared and extruded four times using a 1½ inch extruder. The extrusion temPerature was 390° C. The melt viscosity, volatiles index and end-groups were analyzed before and after each extrusion. Results indicate that the methyl ester end-groups were stable under the conditions of extrusion. Melt viscosity did not change appreciably and the volatiles index remained below 25.

The polymer used in Examples VI and VII was prepared as in Example I at Column 4, lines 23–64, in U. S. Pat. No. 2,946,763 issued July 26, 1960 to M. I. Bro et al. It will be referred to as "FEP polymer" for convenience.

EXAMPLE VI

Twenty grams of FEP polymer, filtered but not dried, were placed in a stainless steel shaker tube of about 20 ml. total volume. 100 ml. of reagent grade methanol was added to the shaker tube which was then sealed and heated to 140° C. for 120 minutes with agitation. At the end of this heating period the cylinder was cooled to room temperature and its contents washed several times with methanol. After air drying the sample until the odor of methanol was not detectable, the sample was dried at 115° C. under vacuum overnight. Infrared analysis of films compression molded at 340° C. showed that 225 methyl ester and 206 perfluorovinyl end-groups per $10^6$ carbon atoms were present, indicating that all carboxylic acid end-groups had been esterified.

EXAMPLE VII

Twenty grams of dry FEP polymer were placed in a stainless steel shaker tube of about 200 cc. total volume. 100 ml. of reagent grade methanol was added to the shaker tube which was then sealed and heated to 190° C. for 120 minutes with agitation. At the end of this heating period the cylinder was cooled to room temperature and its contents washed several times with methanol. After air drying the sample until the odor of methanol was not detectable, the sample was dried at 115° C. under vacuum overnight. Infrared analysis of films compression molded at 340° C. showed that 329 methyl ester and 15 perfluorovinyl end-groups per $10^6$ carbon atoms were present, indicating that all carboxylic acid end-groups had been esterified.

As many apparently widely different embodiments of this invention may be made without departing from the spirit or scope thereof, it is to be understood that this invention is not limited to the specific embodiments thereof except as defined in the appended claims.

What is claimed is:

1. A solid, stable, melt-fabricable copolymer of tetrafluoroethylene monomer and at least one fluoroolefin monomer selected from the group of fluoroolefins having the general formula $$XCF_2(CF_2)_nCF = CF_2$$

where X = F or H and n = 0 – 9, fluorovinyl ethers having the general formula $$XCF_2(CF_2)_nOCF = CF_2$$

where X = F or H and n = 0 – 7, fluorovinyl polyethers having the general formula $$XCF_2(CF_2)_nO\overset{\underset{\displaystyle CF_3}{|}}{C}FCF_2OCF=CF_2$$

where X = F or H and n = 0 – 7, and perfluoro(2-methylene-4-methyl-1,3-dioxolane), said copolymer having acidic end-groups of which at least half have been converted from the original acidic end-groups to end-groups of the formula $$-\overset{\overset{\displaystyle O}{\|}}{C}OCH_3$$

as measured by infrared analysis and a volatiles index of less than 25.

2. The product of claim 1 in which the fluoroolefin monomer is hexafluoropropylene.

3. The product of claim 1 in which the fluoroolefin monomer is perfluoromethyl perfluorovinyl ether.

4. The product of claim 1 in which the fluoroolefin monomer is perfluoroethyl perfluorovinyl ether.

5. The product of claim 1 in which the fluoroolefin monomer is perfluoropropyl perfluorovinyl ether.

* * * * *